(12) United States Patent
Rowe

(10) Patent No.: US 6,288,817 B2
(45) Date of Patent: *Sep. 11, 2001

(54) HIGH DUTY CYCLE SYNCHRONIZED MULTI-LINE SCANNER

(75) Inventor: David M. Rowe, Medway, MA (US)

(73) Assignee: Avanex Corporation, Fremont, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,785
(22) Filed: Jan. 21, 1998
(51) Int. Cl.$^7$ .................................................. G02B 26/08
(52) U.S. Cl. .......................... 359/204; 359/17; 359/216
(58) Field of Search .......................... 359/204, 216, 359/219, 209, 17, 18

(56) References Cited

U.S. PATENT DOCUMENTS

| | | | |
|---|---|---|---|
| 4,971,413 | 11/1990 | Inoue | 350/6.8 |
| 5,107,280 | 4/1992 | Ohashi et al. | 346/108 |
| 5,206,491 * | 4/1993 | Katoh et al. | 359/204 |
| 5,281,812 | 1/1994 | Lee et al. | 250/235 |
| 5,343,224 * | 8/1994 | Paoli | 346/108 |
| 5,654,817 | 8/1997 | De Loor | 359/201 |
| 5,784,094 * | 7/1998 | Ota et al. | 347/243 |
| 5,786,911 * | 7/1998 | Tawa et al. | 359/17 |
| 5,828,483 * | 10/1998 | Schwartz et al. | 359/204 |

FOREIGN PATENT DOCUMENTS 0 542 544 A2   11/1991   (EP) .......................................... 2/475

\* cited by examiner

Primary Examiner—Cassandra Spyrou
Assistant Examiner—Euncha Cherry
(74) Attorney, Agent, or Firm—Sawyer Law Group LLP

(57) ABSTRACT

A scanner includes a single scanning element such as a holographic disc or a polygon mirror and an illumination system that provides a plurality of input beams that are directed to different areas on the scanning element. In one embodiment, a light source provides a single beam that is alternately directed to a first area and a second area. While an input beam is incident on the first area, a first scan line forms. While an input beam is incident on the second area, a second scan line forms. Duty-cycle and energy efficiency of this embodiment are high because the beam from the source is switched from one area to the other during dead time when a scan beam would not otherwise have been directed to the desired scan aperture. Separate scan lines are automatically synchronized since they originate from the same source. Thus, alignment of multiple scan lines to form an extended scan line is simplified. Another embodiment simultaneously directs input beams to different areas of a scanning element to generate a plurality of synchronized scan lines suitable for alignment to form extended scan lines or for use separately in applications such as color printing.

31 Claims, 10 Drawing Sheets

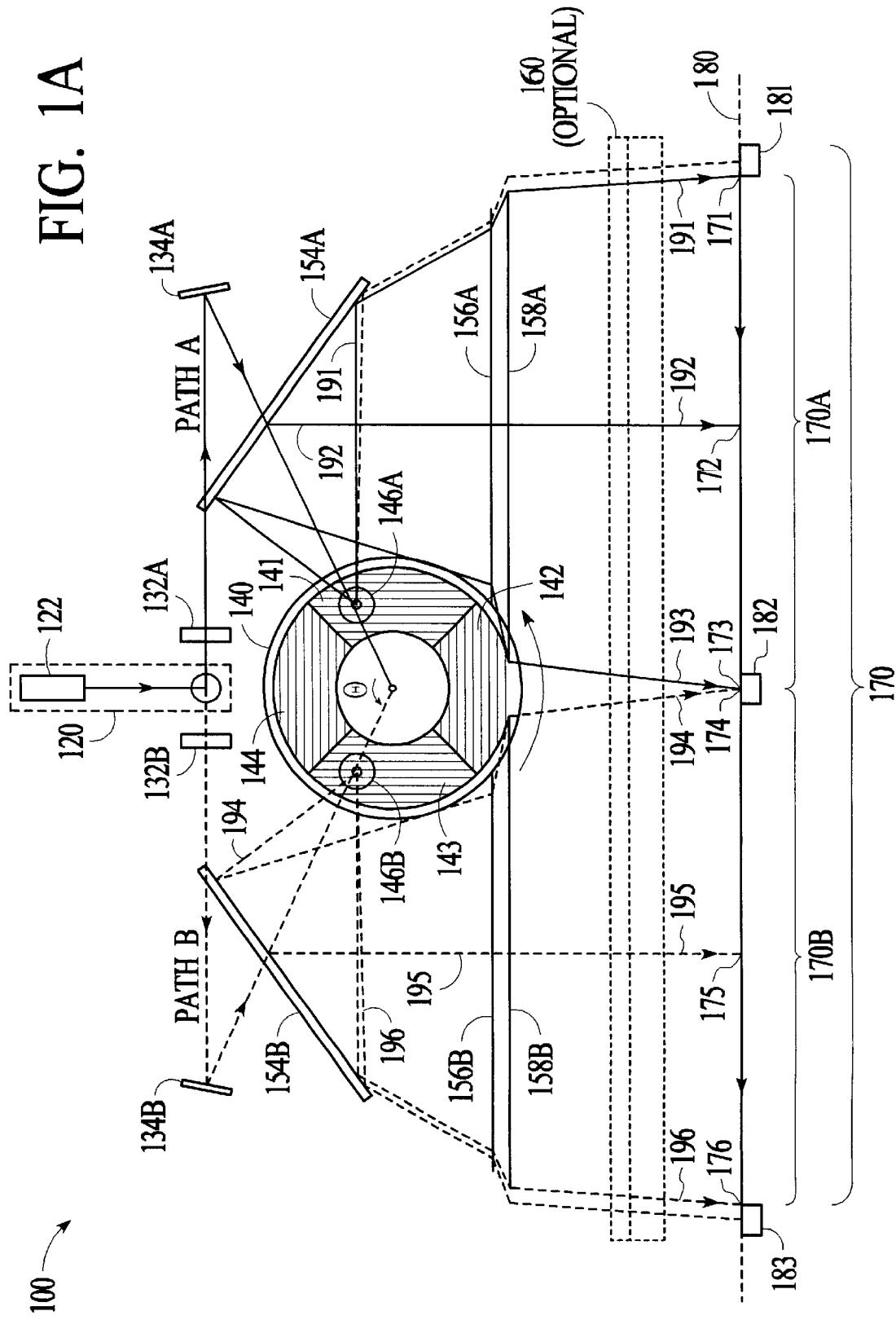

HIGH DUTY CYCLE SYNCHRONIZED MULTI-LINE SCANNER

BACKGROUND

1. Field of the Invention

This invention relates to line scanners and methods for scanning multiple synchronized scan lines using scanners having high duty cycles that conserve illumination source energy.

2. Description of Related Art

Many devices such as printers, inspection devices, and medical equipment contain line scanners. For example, a typical laser printer contains a line scanner that scans a digitally modulated laser beam to form an image on a media such as paper, film, or plates, and in the medical industry, a line scanner in an X-ray machine scans an X-ray beam through a patient or sample to form lines of an image. A typical line scanner includes a scanning element such as a polygon mirror or a holographic disc on which an input beam from a laser or other light source is incident. The scanning element redirects the input beam, for example, by reflection or diffraction, to project a scan beam. Movement such as rotation or oscillation of the scanning element moves or scans the scan beam along a scan line in an image area. Line scanners often include pre-scan and post-scan optical systems that adjust the focus or collimation of the input and scan beams as well the linearity of the scan line and the uniformity of scan rate.

An important property of a line scanner is the duty cycle which is defined by the ratio of the time that the scan beam is imaging to the total operating time. Generally, a line scanner has a periodic motion that includes a dead time during which the line scanner is not directing the scan beam toward the image area. Thus, duty cycles for line scanners are generally less than 100% and typically range from about 20% to 70%. The duty cycle of a line scanner can limit the useful output illumination per unit of input power from a laser or other light source. Accordingly, a low duty cycle line scanner requires either a higher power light source, more efficient optics, or a slower scan rate to provide a fixed amount of useful illuminating energy density. Accordingly, line scanners having high duty cycles are sought.

Another important property of line scanners is the imaging area or scan line length. Conventionally, creating long scan lines to cover a large imaging area requires either a large line scanner or multiple smaller line scanners operated in series. Using multiple line scanners (or scan heads) to create a long scan line has a number of advantages including the ability to design smaller or more compact systems with less expensive scanning heads. However, multiple-head systems often require elaborate and expensive line-connecting optics or electronics to control the relative positions of the scan lines from the various scan heads and to synchronize the independently operating scan heads. This is due in part to the lack of synchronization of the motion of the light sources and the scanning optics in the multiple scan heads. U.S. Pat. No. 5,654,817 describes a system employing multiple scan heads for large area imaging. Line scanners that are compact and do not require expensive line connecting optics or electronics are desired.

SUMMARY

In accordance with an embodiment of the invention, a high duty scanner has a single compact scan head capable of creating multiple synchronized scan lines. The scan lines are easily connected because a single scanning element provides a common reference for the multiple scan lines and in some embodiments because a common light source is oriented relative to each input beam so that motion of the light source manifests itself in each scan line in both the same direction and magnitude to provide synchronization. One embodiment of the invention redirects an input beam to increase the duty cycle of a scanner. In particular, pre-scan optics move an input beam from a first area for incidence on a scanning element to a second area for incidence on a scanning element. In alternate embodiments, the first and second areas contain portions of a single scanning element or alternatively portions of two separate scanning elements. Moving the input beam from the first to the second area occurs when the scanning beam reaches the end of a scan line but the scanning element has not positioned another facet in the first area for the start of another scan line. Upon movement of the input beam, the second facet immediately directs the scan beam into the image area for another scan line or for an extension of a scan line originated from the first facet. Moving the input beam thus can increase the duty cycle by increasing the time during which the scan beam is in the image area. The scan line length increases when second facet extends a scan line the first facet previously started.

Alternatively, multiple input beams either derived from a common light source and beam splitters or from multiple light sources, are directed to multiple separated areas on a single scanning element to generate multiple synchronized scan lines. Timing of the multiple scan lines depends on the relative positions of the incident areas of the multiple input beams so that scan lines can be simultaneously or sequentially scan.

The synchronized scan lines can be used separately in applications such as color laser printing or can be aligned for formation of a single extended scan line. Whether simultaneous input beams or alternating input beams are used, a single scanning element and/or light source simplifies alignment of multiple scan lines for formation of an extended scan line because many variations of the scanning element and light source are common to all of the scan lines that constitute the extended scan line.

In one embodiment of the invention a scanner includes a scanning element such as a holographic disc or a polygon mirror and an illumination system that directs a first input beam to a first area and a second input beam to a second area. The first and second areas are separated from each other and situated so that portions of the scanning element move through the first and second areas during a scanning operation. First and second scan beams respectively originate from deflections of the first and second input beam by portions of the scanning element in the first and second areas. The input beams encountering the scanning element are oriented so that motion of both scan beams are synchronized for a given light source motion, and thus motion of the light source does not affect synchronization or alignment of the scan beams. Post-scan optics direct the first and second scan beams to illuminate first and second scan lines which can be used separately or aligned for joining that forms of an extended scan line. When the scan lines are aligned, a beam detector assembly can be positioned between the scanning element and an image plane in which the extended scan line is formed and in a gap between a path of the first scan beam to the end of the first scan line and a path of the second scan beam to the start of the second scan line. In one embodiment, the detector assembly is mounted on the back of a mirror having a first mirrored section positioned to reflect the first scan beam, a second mirrored section positioned to reflect the second scan beam, and a transparent section between the first and second mirrored sections.

BRIEF DESCRIPTION OF THE DRAWINGS

FIG. 1A shows a top view of a line scanner including a holographic disc as a scanning element that forms multiple scan lines in accordance with an embodiment of the invention.

Use of the same reference symbols in different figures indicates similar or identical items.

DETAILED DESCRIPTION OF THE PREFERRED EMBODIMENTS

In accordance with an embodiment of the invention, a high duty cycle scanner uses a single scanning element such as a polygon mirror or holographic disc, to create multiple synchronized scan lines. The synchronized scan lines are easily connected to create an extended scan lines of greater length because the multiple scan lines have common characteristics that arise from the common scanning element and the common orientation of the light source. The scanner can switch an input beam from one area containing a portion of the scanning element to another area during a "dead zone" when a scan beam would not be directed into the image area. As used herein, the dead zone is defined as the period of time between the end of one scan line and the start of the next scan line, and the downtime is defined as the time during which the laser beam is performing no useful function. Redirecting the input beam from one area to another can place a scan beam back in the image area and thus reduce the downtime of the scanner. The incident areas could contain portions of the same scanning element or correspond to and contain portions of different scanning elements. By deflecting the input beam from a first area to a second area during the dead zone of the first area and back to the first area during the dead zone of the second area, a scanner can exhibit a duty cycle of greater than 90%.

If the input beam switches to an area containing another facet of the same scanning element, the two scan lines are synchronized. In addition, if the same light source generates the input beams to multiple areas, the motion of each scan line due to pointing error of the light source is synchronized. Synchronized scanning and light source pointing allow for better in-scan and cross-scan control of where scan lines connect. Thus, less costly correction techniques can align the multiple scan lines.

Figure 1B:
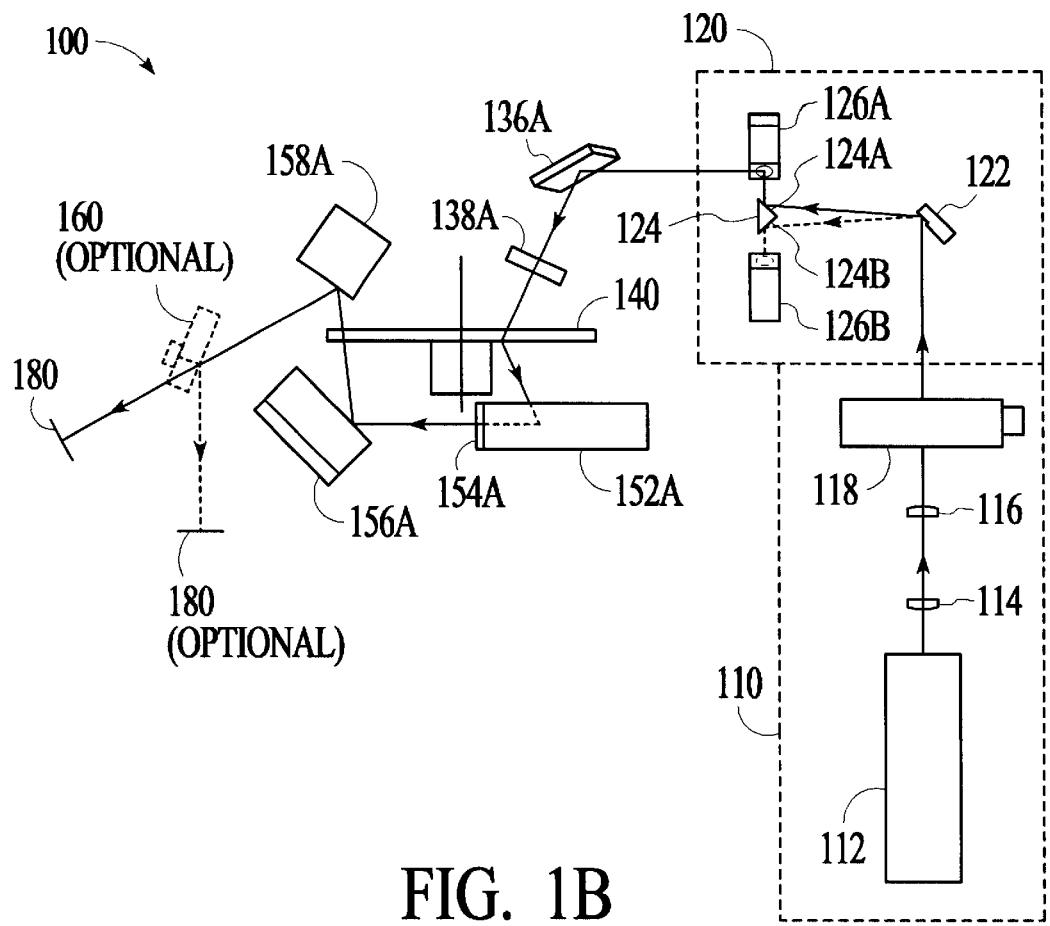
FIGS. 1B and 1C show side views of portions of the line scanner of FIG. 1A.

FIGS. 1A and 1B respectively show a top view and a side view of a line scanner 100. Line scanner 100 includes a light source 110, path selection optics 120, pre-scan optics, a scanning element 140, and post-scan optics. Light source 110 generates an input beam such as a laser beam which path selection optics 120 and the pre-scan optics direct onto scanning element 140 with proper input beam orientation. In the specific embodiment shown in FIG. 1B, light source 110 includes a laser 112, beam shaping elements 114 and 116, and an acousto-optic modulator (AOM) 118 that digitally modulates the input beam's intensity. Such light sources are well known for line scanners used in laser printers. An alternative embodiment of the invention uses laser diode light sources that can be modulated internally, eliminating the need for the AOM 118. An alternative embodiment of the invention uses a light source other than lasers, for example, an LED (light emitting diode) or an x-ray source and eliminates AOM 118 if modulation of the input beam is not required. Beam shaping elements 114 and 116 are selected as required to provide a beam profile for the application of line scanner 100.

Figure 1C:
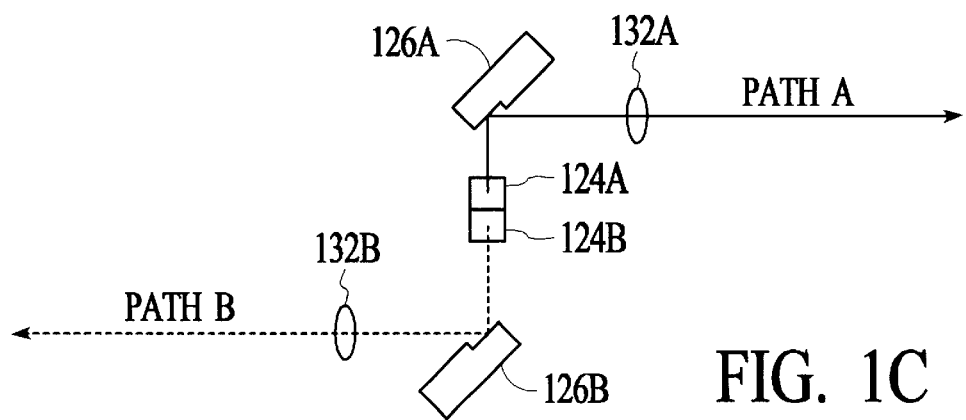

Path selection optics 120 switch the input beam back and forth between two paths, path A and path B. In the embodiment shown, path selection optics 120 include an adjustable deflector 122 and a fixed deflector 124 having two facets 124A and 124B. Adjustable deflector 122 can be a piezoelectrically driven deflector mirror, acousto-optical deflector (AOD) or any device that allows control over the exit angle of a light beam. Fixed deflector 124 is a prism, a pair of mirrors oriented at a 90° angle, or any device that deflects a beam along sufficiently separated paths. In operation, deflector mirror 122 deflects the beam from source 110 onto one or the other of facets 124A and 124B of deflector 124. From facet 124A, the beam reflects to an adjustable deflector 126A and along path A. From facet 124B, the beam reflects to an adjustable deflector 126B and along path B. FIG. 1C illustrates how path A and path B are widely separated, e.g., in opposite directions. Light source 110 and path selection optics 120 are oriented so that movement of or changes in light source 110 or path selection optics 120 causes synchronized movement of path A and path B at the image plane. In particular, the images of light source 110 formed from beams along path A and path B should have the same orientation, for example, both upright or both inverted. In scanner embodiments employing a common light source for multiple beams, optics that synchronize movement of the scan beams reduce the effects of pointing error because movement of the light source causes matching changes in all of the scan beams.

A control circuit (not shown) periodically switches the orientation of adjustable deflector 122 from a configuration directing the input beam along path A to a configuration directing the input beam along path B. As described further below, the orientation of adjustable deflector 122 for the two configurations is selected to align a scan line generated when the beam is incident scanning element 140 from path A with a scan line produced when the beam is incident on scanning element 140 from path B. Deflector 122 selects a path A or B by positioning the beam on facet 124A or 124B and positions the beam on the selected facet for alignment along the in-scan direction. Deflectors 126A and 126B position their respective beams for cross-scan alignment of the two scanned lines A and B relative to each other.

From selection optics 120, the input beam travels through pre-scan optics along the selected path. For path A or B, the beam passes through a first beam shaping lenses 132A or 132B, reflects from two fold-mirrors 134A and 136A or 134B and 136B, and then passes through a second beam shaping lens 138A or 138B before reaching holographic scan element 140. FIG. 1A does not show mirrors 136A and 136B and lenses 138A and 138 which overlie and would obscure the top view of scanning element 140. For simplicity of illustration, FIG. 1B omits lens 132A, mirror 134A, and the pre-scan optical elements along path B.

The input beam is incident on a portion of scanning element 140 that is currently within an area 146A or 146B, depending on whether optics 120 selected path A or B. During scanning, scanning element 140 rotates so that the portions of scanning element 140 within areas 146A and 146B constantly change. Changes in the properties of the portions of scanning element 140 within areas 146A and 146B change the angle at which the scan beam emerges and scan the scan beam along a scan line. Adjusting the orientations of deflectors 122 and 126A or 126B selects the location of incident area 146A or 146B, the radius at which the input beam strikes scanning element 140, and the cross-scan position of a scan line 170 in an image plane 180.

In the post-scan optics, the scan beam initially reflects from fold mirrors 152A and 154A or 152B and 154B onto a first aspheric curved mirror 156A or 156B. Mirror 156A or 156B in turn reflects the scan beam onto a second aspheric curved mirror 158A or 158B. The size of mirrors 156A, 156B, 158A, and 158B and gaps between mirrors 156A and 156B or mirrors 158A and 158B along with the property of the portions of scanning element 140, control scan line apertures and the lengths of scan lines 170A and 170B. The focusing properties of curved mirrors 156A, 156B, 158A, and 158B are selected according to the application of line scanner 100. In particular, curved mirrors 156A, 156B, 158A, and 158B provide a linear scan (i.e., a constant scan speed at a constant rotation speed of scanning element 140), correct bow caused by scanning element 140, flatten the focus field (so that all points along the scan line are in focus), and create a quasi-telecentric scanned beam at the focal plane. Many alternative embodiments of the post-scan optics are known in the art or can be created. For example, curved mirrors 156A, 156B, 158A, and 158B could be replaced by more complex reflective and/or transmissive optics that provide scan lines of any desired characteristics.

Curved mirrors 158A and 158B form scan lines 170A and 170B on the same image plane 180. An optional line-correction mirror 160 which monitors the position of the scan beams and the resulting scan lines is inserted between image plane 180 and mirrors 158A and 158B. If line-correction mirror 160 is used, the scan beam reflects from correction mirror 160 to image plane 180.

In the exemplary embodiment, scanning element 140 is a multi-faceted holographic scan disc attached to a motor assembly. The holographic scan disc has four facets 141, 142, 143, and 144, each of which spans 90° and diffracts the beam into post-scan optics when selection optics 120 select a portion of the facet in area 146A or 146B. Of the 90° of each facet, about 40.5° beginning about 24.75° from a leading edge of the facet is for scanning and directs the beam to a path ending in a desired portion of the image plane. For the exemplary embodiment, scanning of extended scan line 170 requires a rotation of about 90° (one facet of scanning element 140). Each extended scan line 170 includes two scan lines 170A and 170B that two separate facets of scanning element 140 provide.

In an example scanning process, facets 141 and 144 scan the scan beam respectively along scan lines 170A and 170B which are aligned and concatenated to create extended scan line 170. Selection optics 120 select area 146A when scanning element 140 is oriented so that facet 141 is in area 146A and directs a scan beam along a path 191 to the start 171 of scan line 170A. At this point, the portion of facet 141 in area 146A is about 24.75° from the edge of facet 141 in the exemplary embodiment. Scanning element 140 then rotates about 20.25° while the scan beam in image plane 180 moves until facet 141 directs the scan beam along a path 192 to the midpoint 172 of scan line 170A. Rotation through the next 20.25° moves the scan beam the same distance further to the end point 173 of scan line 170A where the scan beam is along a path 193 passing under scanning element 140. At this point, scan line 170A from facet 141 is complete, and path selection optics 120 switch the input beam from path A to path B.

Areas 146A and 146B are separate from each other by an odd number of half facets, which in FIG. 1A is an angle θ of 135°. Scanning element 140 must rotate another 4.5° before facet 144 is in position to direct the scan beam to the start of scan line 170B. Accordingly, path selection optics 120 have the time required for a 4.5° rotation to switch the path of the input beam. The portion of facet 144 is in area 146B, at that point, directs the scan beam along a path 194 which ends at the starting point 174 of scan line 170B. Accordingly, scanning element 140 rotates through 45° (half a facet) between the start of scan line 170A and the start of scan line 170B. If scanner 100 is properly adjusted, the start point 174 of scan line 170B is at substantially the same location as the end point 173 of scan line 170A. Adjustment of the positions of the scan lines is discussed below. The scan beam moves from starting point 174 to end point 176 of scan line 170B while scanning element 140 rotates through 40.5°. At this point, extended scan line 170 is complete, and path selection optics 120 switch the input beam back to path A for the start of the next scan line. For the next extended scan line 170, facet 142 sweeps the image beam across scan line 170A, and facet 141 sweeps the image beam across scan line 170B.

Alternative systems and methods are available for monitoring the position of scan lines 170A and 170B. One system uses a start-of-scan (SOS) position detector assembly 181, a central position detector assembly 182, and an end-of-scan (EOS) position detector assembly 183, which are located at or near the image plane 180. Detector assemblies 181, 182, and 183 can be mounted above scan line 170 to allow mounting in the dual head casting which is a frame for mounting of the various optical components. SOS detector assembly 181 and EOS detector assembly 183 are located outside of the scan aperture (i.e., the boundaries of scan line 170) and are similar or identical to SOS and EOS detector assemblies found in conventional laser printers, image setters and many other scanning devices. Central position detector assembly 182 is at or near the center of scan line 170. During typical operation of scanner 100, media being scanned blocks central position detector assembly 182. However, prior to scanning media, central detector assembly 182 can accurately determine the relative positions of the end of scan line 170A and the start of scan line 170B in both the cross-scan and in-scan directions. Detector assemblies 181 and 183 then control the pixel clock data rate and the scan rate of scan lines 170A and 170B when scanning media.

Figure 2:
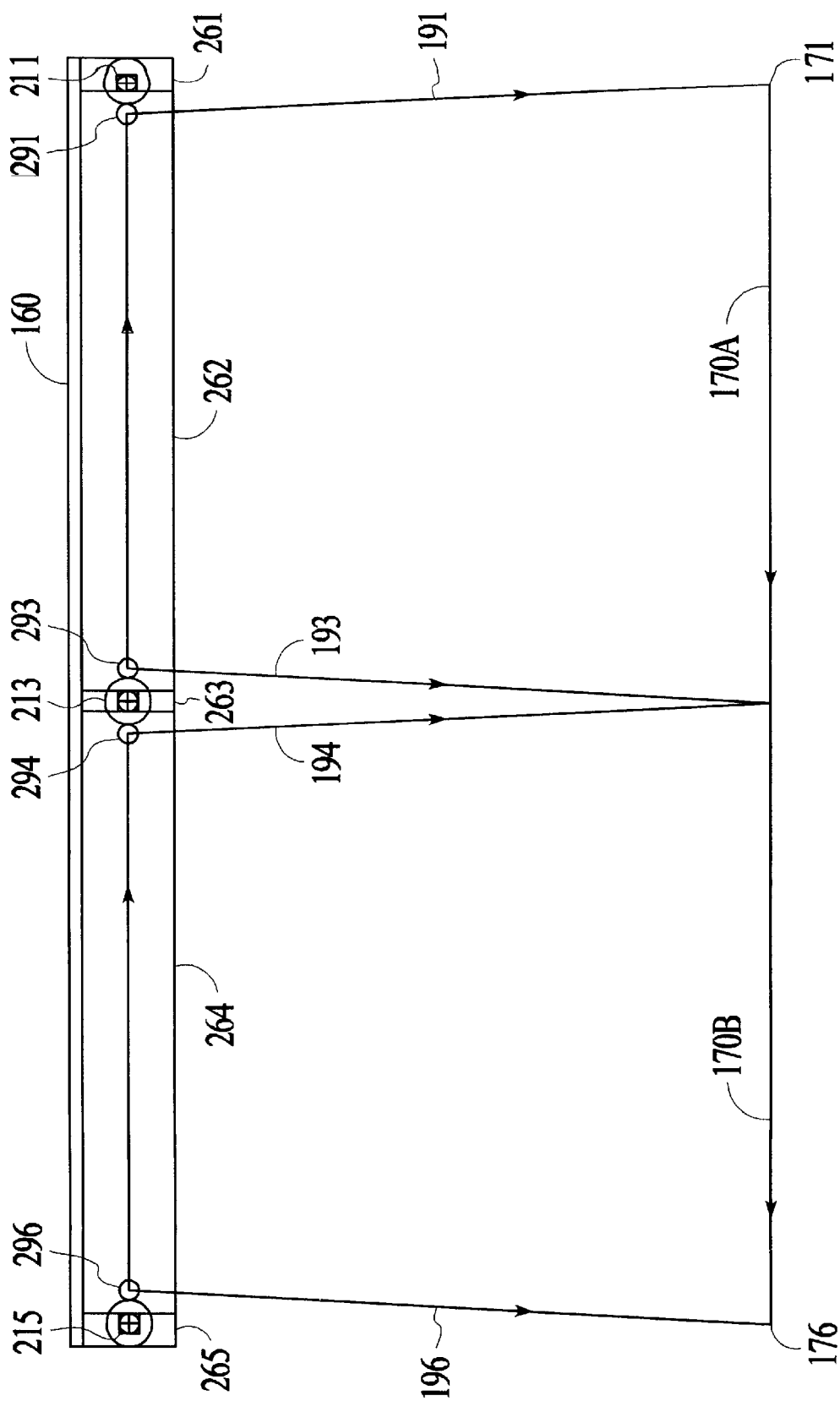
FIG. 2 shows an optional mirror and sensor system for aligning scan lines in the line scanner of FIG. 1A.

Another system for monitoring scan line position includes optional line correction mirror 160 which is between a final focusing element of scanner 100 and the image plane containing scan line 170. FIG. 2 shows an embodiment of mirror 160 which includes two mirrored sections 262 and 264 and three transparent sections 261, 263, and 265. Mirror 160 can be made up of two separate mirrors mounted on a rigid platform with transparent sections between the mirrors or one continuous mirror that is silvered in only the desired sections. Mirrored section 262 reflects the scan beam during formation of scan line 170A and lies between an area 291 where path 191 reflects from mirror 160 and an area 293 where path 193 reflects from mirror 160. Mirrored section 264 reflects the scan beam during formation of scan line 170B and lies between an area 294 where path 194 reflects and an area 296 where path 196 reflects. Scanner 100 is not perfectly telecentric and causes beam paths 191, 193, 194, and 196 to "toe out." This allows transparent section 263 to be in the gap between areas 293 and 294.

Beam position detector assemblies 211, 213, and 215 are mounted behind mirror 160 in transparent areas 261, 263, and 265, respectively. Detector assemblies 211 and 215 are respectively the start-of-scan (SOS) and end-of-scan (EOS) detector assemblies. Detector assembly 213 is a central detector assembly that monitors the positions of the end of scan line 170A and the start of scan line 170B. An advantage of central detector assembly 213 when compared to central detector assembly 182 of FIG. 1A, is that central detector assembly 213 is upstream of the image plane and not blocked by media in position for scanning. A control system (not shown) is connected to position detector assemblies 211, 213, and 215 and monitors the in-scan timing and the cross-scan positions of scan lines 170A and 170B. In particular, detector assemblies 211, 213, and 215 provide feedback on position and timing of the scan lines to the control system which in turn adjusts scanner 100 (e.g., deflectors 122, 126A and 126B of FIG. 1 A) to align scan lines 170A and 170B. Based on the information from detector assemblies 211, 263, and 265, the control system also provides a signal to the pixel clock to synchronize pixel speed and location within scanned beams 170A and 170B.

Figure 3:
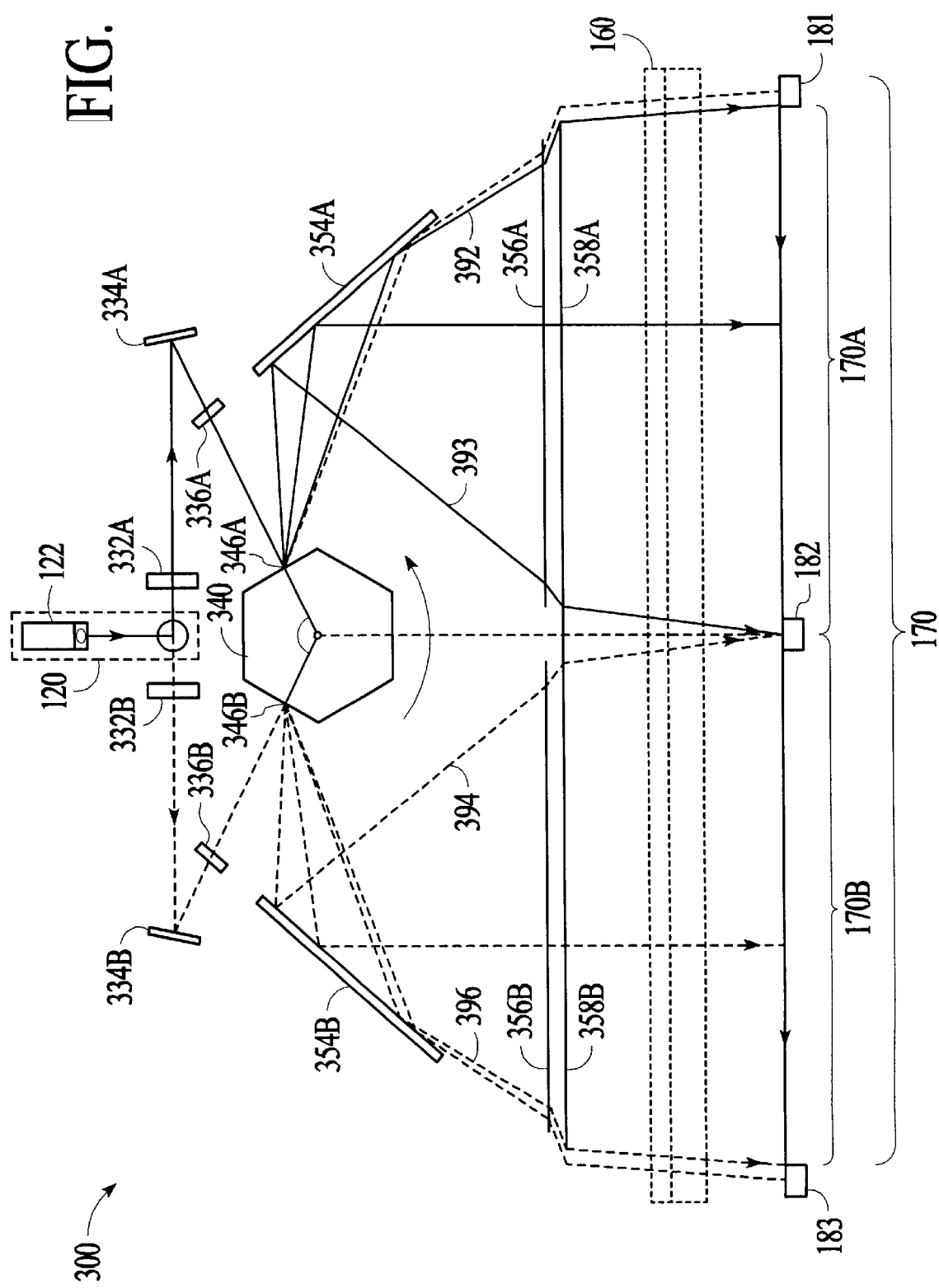
FIG. 3 shows a top view of a line scanner including a polygon mirror as a scanning element that forms multiple scan lines in accordance with an embodiment of the invention.

FIG. 3 illustrates a scanner 300 in accordance with another embodiment of the invention. Scanner 300 differs from scanner 100 primarily in that a scanning element 340 of scanner 300 is a polygon mirror instead of a holographic disc as used for scanning element 140 of scanner 100. In scanner 300, light source 110 and path selection optics 120 direct an input beam to pre-scan optics including lenses 332A and 332B and mirrors 334A, 334B, 336A, and 336B. As described below in regard to other embodiments of the invention, instead of selection optics 120 which switch the path of the input beam, input beams can be simultaneously directed along paths A and B using multiple light sources or a single light source and a beam splitter. In the embodiment shown in FIG. 3, the pre-scan optics direct an input beam to an incident area 346A or 346B containing a portion of scanning element 340. Scan element 340 directs a scan beam into post scan optics including flat mirrors 354A and 354B and focusing mirrors 356A, 356B, 358A, and 358B. The post scan optics may also include optional line correction mirror 160. Scanning element 340 rotates so that while the input beam is incident area 346A, the scan beam scans scan line 170A. While the input beam is incident area 346B, the scan beam scans scan line 170B.

In an exemplary embodiment of the invention, scanning element 340 is hexagonal. For scan line 170A, path selection optics 120 direct the input beam to area 146A while scanning element rotates about 30° (i.e., about half the angular extent of a facet of scanning element 240.) Path selection optics 120 then switch the input beam to area 146B while scanning element 340 rotates through another 30° rotation (i.e., another half facet rotation). Path selection optics 120 then switch the input beam back to incident area 346 at which point another facet of scanning element 340 is back in position for the start of another scan line.

Figure 4A:
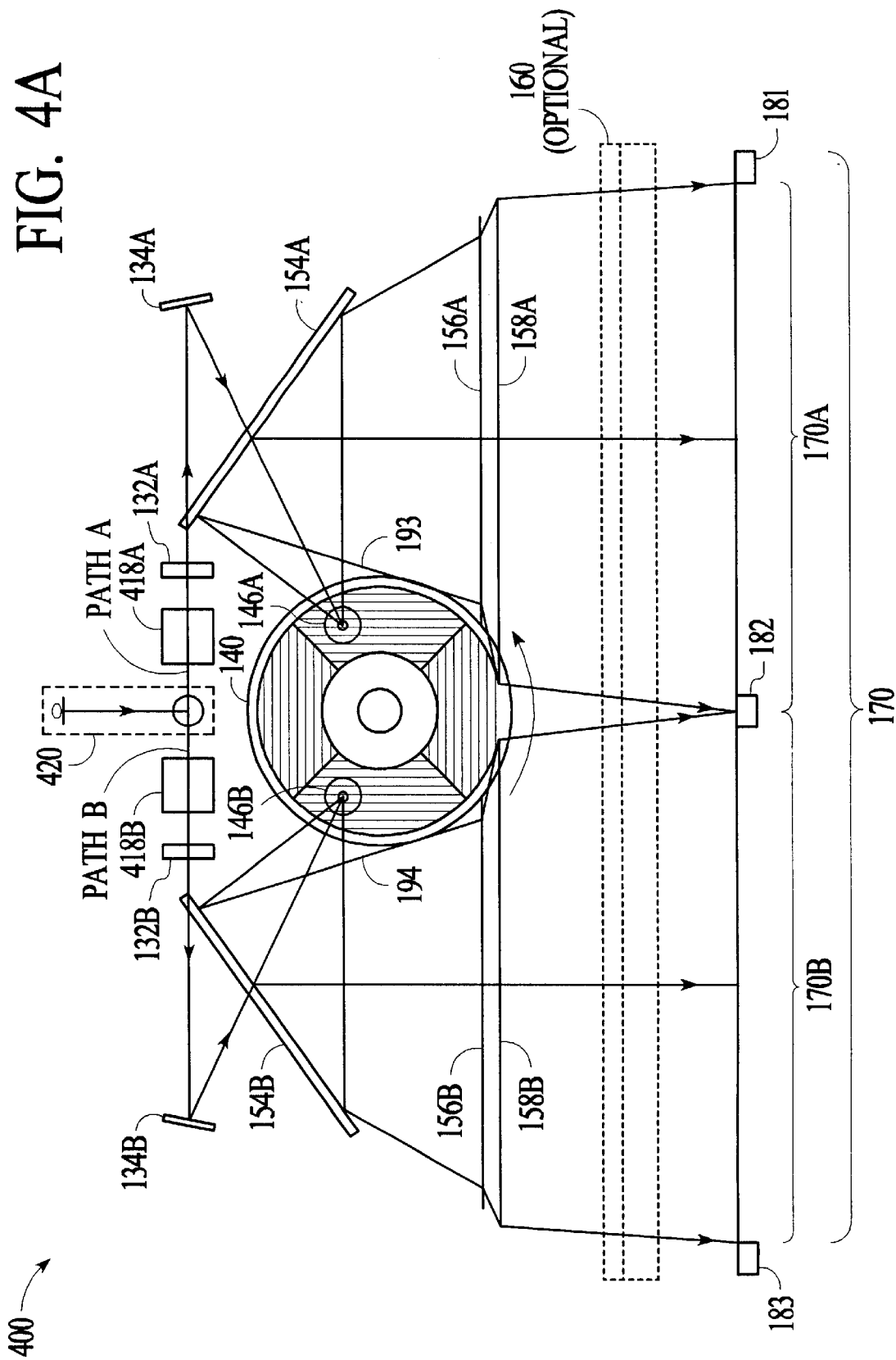
FIGS. 4A and 4B respectively show a top view and a side view of a line scanner using a single light source and a beam splitter to provide multiple input beams in accordance with an embodiment of the invention.
Figure 4B:
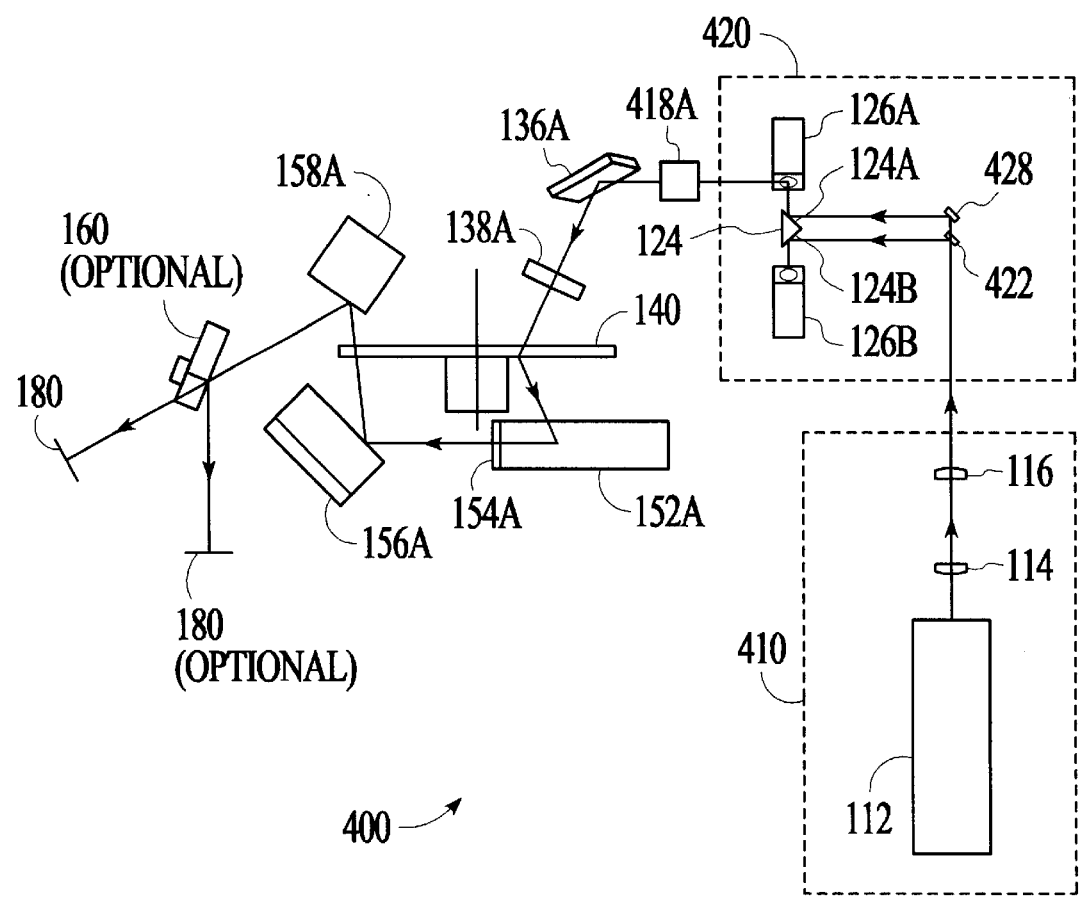

FIGS. 4A and 4B illustrate a line scanner 400 which simultaneously directs input beams along paths A and B. Scanner 400 includes a common light source 410 that contains a laser 112 and beam shaping elements 114 and 116 as described for light source 110 of FIG. 1B but does not include an acousto-optical modulator. Light source 110 directs a source beam to beam separation optics 420 which split the source beam into two input beams, one directed along path A and another directed along path B. Beam separation optics 420 include a beam splitter 422 (e.g., a half silvered mirror or other means of dividing the source beam into two equal energy input beams) and deflectors 124, 126A, 126B, and 428. Beam splitter 422 simultaneously directs a first input beam via deflector 428 to facet 124A of deflector 124 and a second input beam to facet 124B of deflector 124. The first and second beams respectively reflect from deflectors 126A and 126B and propagate along respective paths A and B. Acousto-optical modulators 418A and 418B are in respective paths A and B and control beam intensity into the pre-scan optics and the portions of scanning element 140 in respective areas 146A and 146B. In paths A and B, scanner 400 includes: pre-scan optical elements 132A, 132B, 134A, 134B, 136A, 136B, 138A, and 138B; scanning element 140; and post-scan optical elements 152A, 152B, 154A, 154B, 156A, 156B, 158A, and 158B which are the same as the elements described above in regard to FIGS. 1A and 1B.

With scanning element 140 as described above and areas 146A and 146B separated by an odd number of half facets, only one of areas 146A and 146B at a time contain a portion of scanning element 140 that directs a scan beam into extended scan line 170. Accordingly, separation optics 420 always directs one of the input beams down a path (A or B) that currently does not lead to scan line 170. This reduces the percentage of illumination power utilized for imaging. However, scanning element 140 automatically alternates between directing a scan beam from area 146A to scan line 170A and directing a scan beam from area 146B to scan line 170B and does not require control logic and beam path switching that is synchronized with the rotation of scanning element 140. The delay between the scan beam from area 146A reaching the end of scan line 170A and the scan beam from area 146B starting scan line 170B can be adjusted by changing the angle between areas 146A and 146B. In one embodiment, areas 146A and 146B are positioned so that area 146A and area 146B simultaneously direct scan beams along respective paths 193 and 194. This eliminates the delay between the end of scan line 170A and the start of scan line 170B. The elimination of the delay can simplify cross-scan corrections required in applications where a medium moves at constant velocity in the cross-scan direction relative to scanner 400 during scanning. Larger changes in the relative positions of areas 146A and 146B can implement a variety of scanning options including simultaneous scanning of scan lines 170A and 170B.

Figure 5:
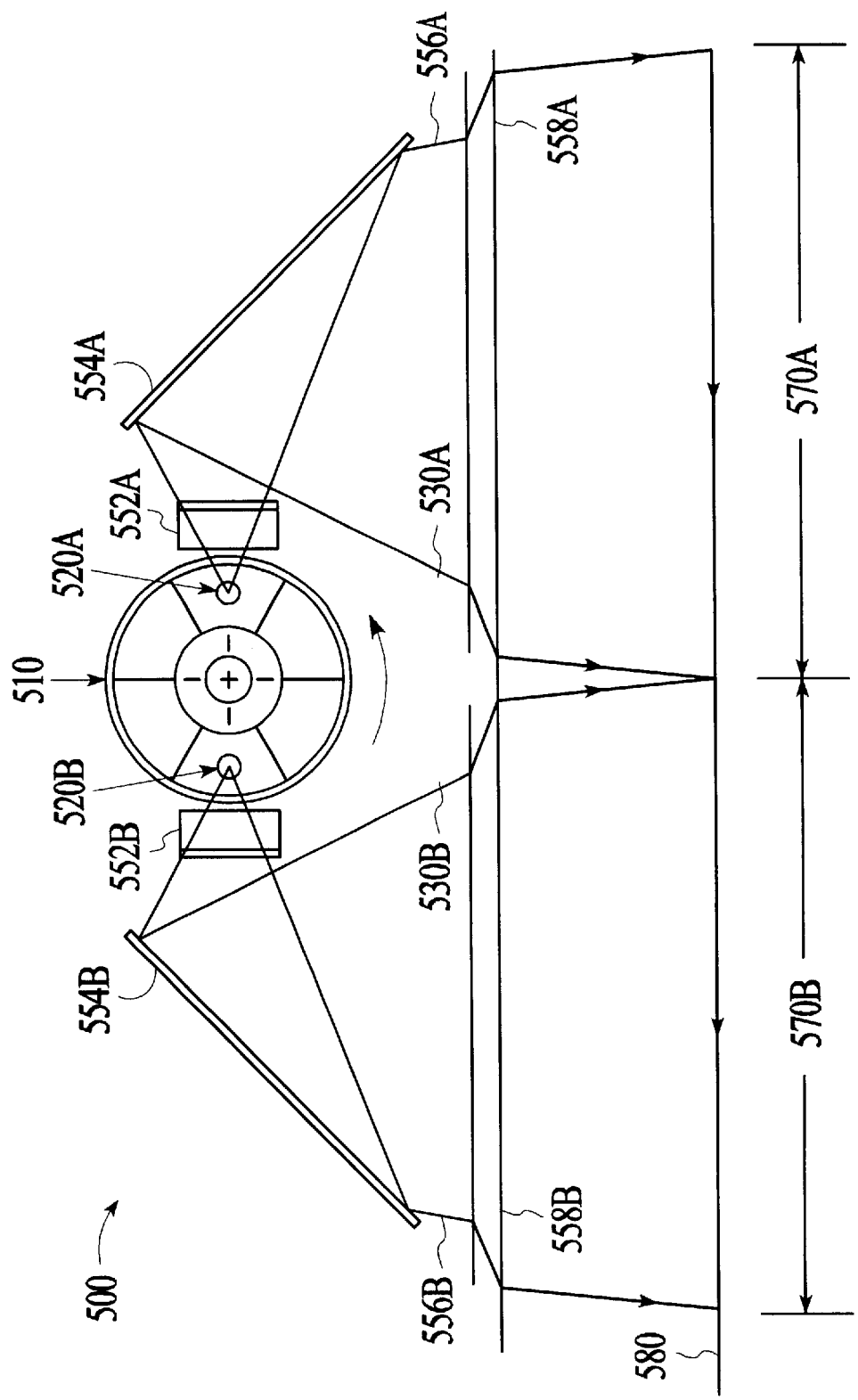
FIG. 5 illustrates a scanner in accordance with an embodiment of the invention that uses a single scanning element to scan two scan lines.

FIG. 5 illustrates a scanner 500 which simultaneously scans scan lines 570A and 570B. Scanner 500 has two input beams derived from a common light source using separation optics such as describe in regard to FIG. 4B, a scanning element 510 with four substantially identical facets, and incident areas 520A and 520B that are an integer number of facets apart, e.g., 180° apart relative to a rotation axis of scanning element 510. With this orientation, incident areas 520A and 520B simultaneously contain portions of scanning element 510 that direct scan beams to scan lines 570A and 570B. The post-scan optics include flat mirrors 552A, 552B, 554A, and 554B and focusing elements such as curved mirrors 556A, 556B, 558A, and 558B which simultaneously direct scan beams 530A and 530B from areas 520A and 520B to the same image plane 580.

Figure 6:
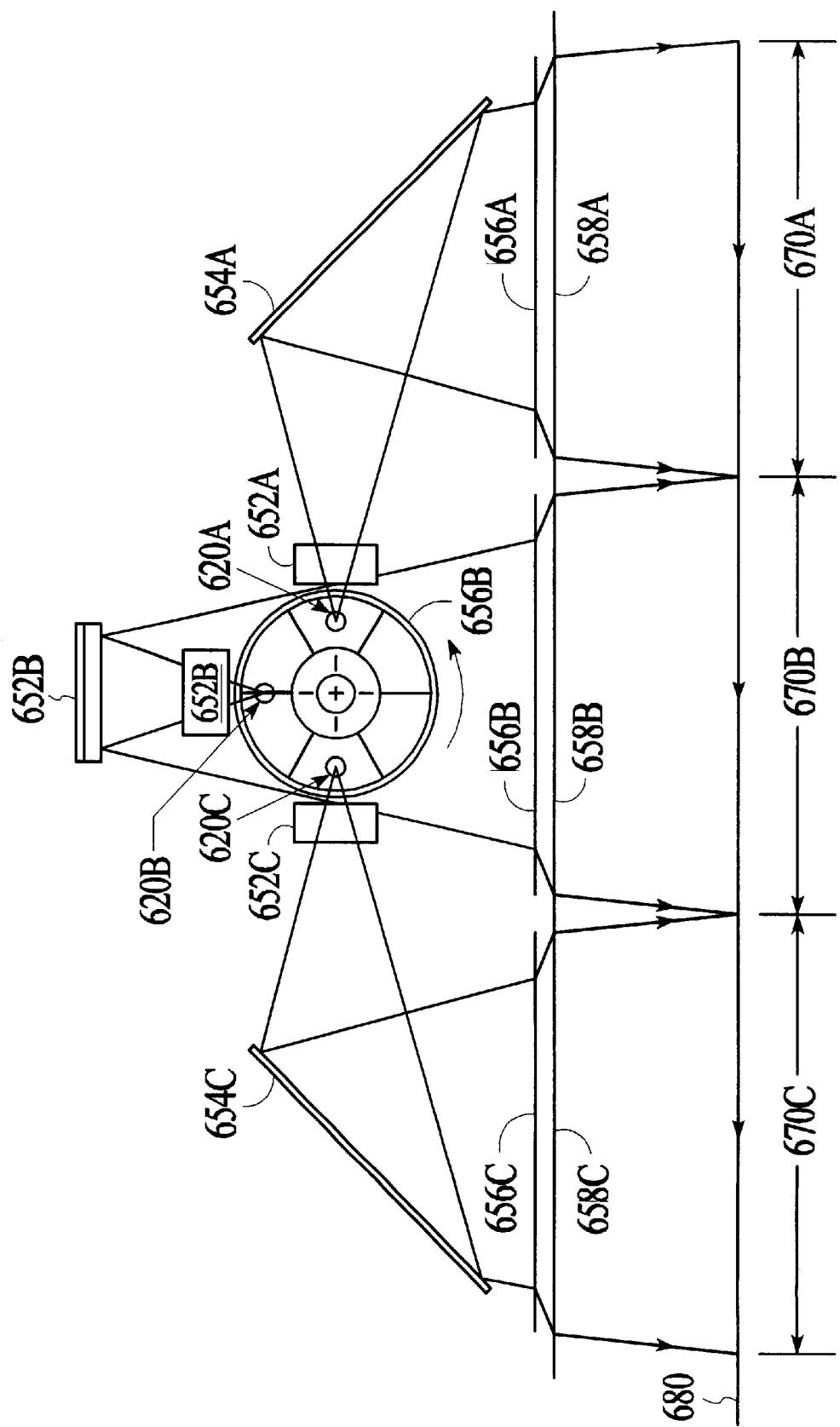
FIG. 6 illustrates a scanner in accordance with an embodiment of the invention that uses a single scanning element to scan three scan lines.

FIG. 6 illustrates a scanner 600 which has three input beams (not shown) that simultaneously illuminate three synchronized areas 620A, 620B, and 620C. Either separate light sources or a common light source with a beam splitter can generate the three input beams. Areas 620A, 620B, and 620C are situated so that identical portions of three different facets of a scanning element 610 are simultaneously in areas 620A, 620B, and 620C. Post-scan optics direct scan beams from areas 620A, 620B, and 620C to an image plane 680 where scan lines 670A, 670B, and 670C form. The post-scan optics include six flat mirrors, 652A, 652B, 652C, and 654A, 654B, and 654C which direct scan beams from respective areas 620A, 620B, and 620C to three identical focusing systems (curved mirrors) 656A and 658A, 656B and 658B, and 656C and 658C, respectively. Mirrors 652A, 652B, 652C, and 654A, 654B, and 654C are positioned so that the optical path length from areas 620A, 620B, and 620C to respective focusing systems 656A and 658A, 656B and 658B, and 656C and 658C are the same. When a common light source is used, proper orientation of the input beams before deflection in area 620A, 620B or 620C causes the image of the light source to have the same orientation at each of the scan lines 670A, 670B, and 670C. This allows changes in the orientation of a common light source (not shown) to cause matching shifts in each of the scan lines 670A, 670B, and 670C and thereby improves the scanner's tolerance of pointing error.

Systems similar to scanner 600 can generate four or more simultaneous synchronized scan beams in an image plane. For four or more simultaneous scan beams, an illumination system has pre-scan optics that direct four or more input beams to four or more respect incidence areas. The incidence areas simultaneously contain the same portions of different facets of a scanning element. Post-scan optics can include, for example, four or more similar or identical focusing systems and injection optics that direct scan beams from the incidence areas to corresponding focusing systems. The injection optics may differ for each incidence area but provide the same optical path lengths from incidence areas to the focusing systems. The geometry of the injection optics depends on the number of facets on the scanning element and the locations of the incidence areas relative to the scanning element. Pre-scan optics can compensate for differences in the injection optics so that each image formed by a scan beam has the same orientation as images formed by the other scan beams.

An advantage of above scanners where multiple scan beams simultaneously originate from a common light source and a scanning element/motor assembly is the high degree of synchronization of the scan beams. Known line-scanner effects such as wedge (deviation in parallelism of two surfaces of the disc), wobble of motor bearings, disc eccentricity, and variations in the rotational speed of the scanning element have substantially less effect on the synchronization of scan lines from a common scanning element and a common light source than on the synchronization of scan lines from separate scanning elements. Additionally, timing synchronization between the two scan lines is automatic for a single scanning element, whereas in the two element system, the rotational orientation of the two scanning elements must be synchronized every time the device is powered up. In particular, when starting a system having two scanning elements, the rotational speed of each element is adjusted in an iterative fashion to match not only the speeds but also the relative phases of the elements. A scanner using a single scanning element has the further advantages of being relatively compact and inexpensive because a single scanning head provides multiple scan beams without requiring costly components for scan line synchronization. Prior systems have required a separate scan head for each scan beam and complicated synchronization systems.

Figure 7:
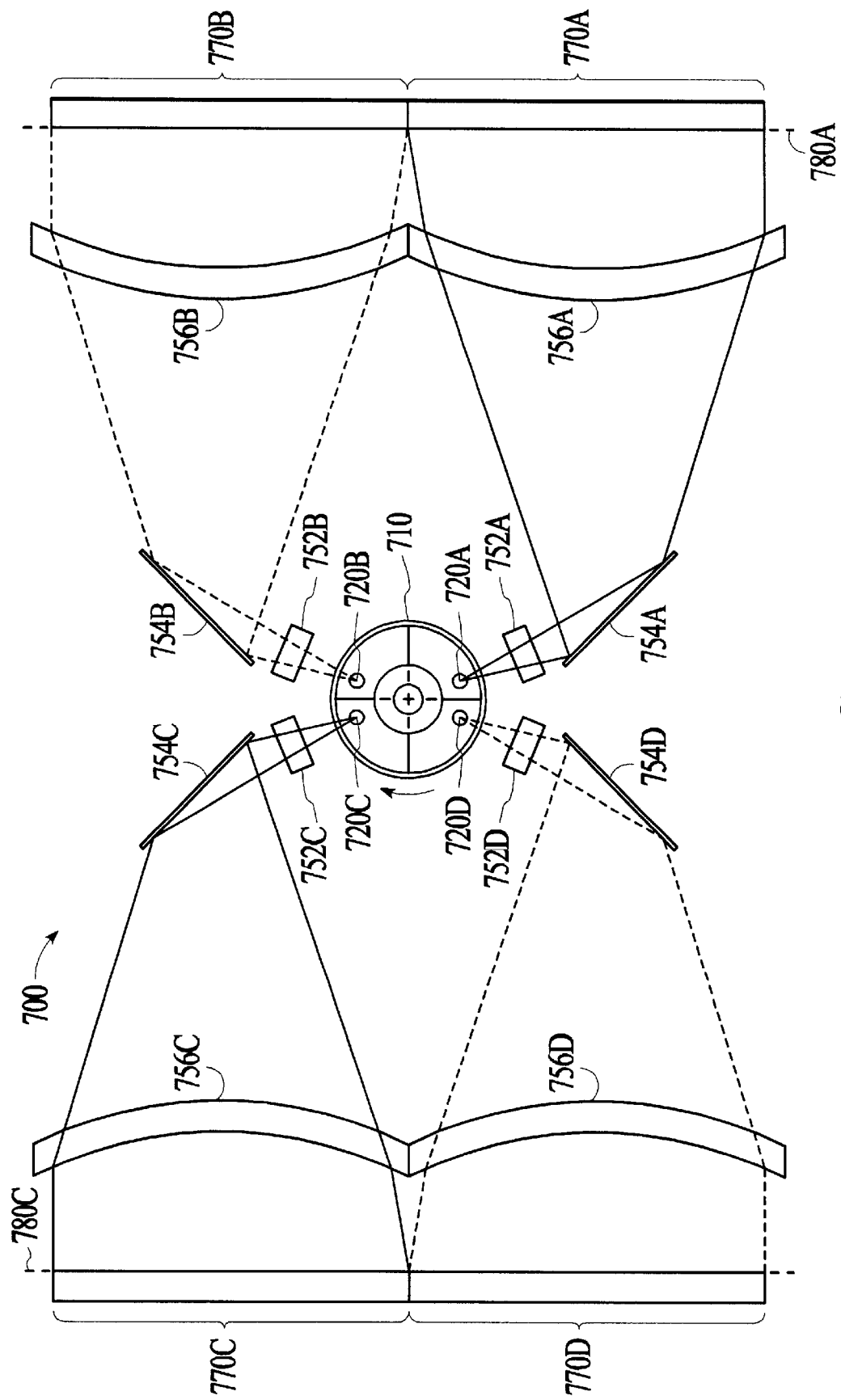
FIG. 7 illustrates a scanner in accordance with an embodiment of the invention that uses a single scanning element and two simultaneous beams with path switching to an four scan lines.

FIG. 7 shows a scanner 700 in accordance with an embodiment of the invention that incorporates multiple input beams and/or switching of the paths of the input beams to provide a high duty cycle. Scanner 700 includes a scanning element (holographic disc) 710 having four facets and an illumination system (not shown). In a first configuration, the illumination system simultaneously directs four input beams to incidence areas 720A, 720B, 720C, and 720D. In a second configuration, the illumination system simultaneously directs two input beams to two of four incidence areas 720A, 720B, 720C, and 720D at a time. In a third configuration, the illumination system serially directs a single input beam to areas 720A, 720B, 720C, and 720D. Post-scan optics direct scan beams from areas 720A, 720B, 720C, and 720D for formation of respective scan lines 770A, 770B, 770C, and 770D. In scanner 700, scan lines 770A and 770B are aligned in an image plane 780A to form an extended scan line. Similarly, the post scan optics form scan lines 770C and 770D in an image plane 780C to form a second extended scan line. Alternatively, the post-scan optics can direct each scan line 770A, 770B, 770C, and 770D to four different image planes to form four separate scan lines or direct all four scan lines 770A, 770B, 770C, and 770D to the same image plane. Scan lines in a common image plane can be aligned and synchronized to form one long scan line or simultaneously illuminate two or more parallel scan lines.

In the first illumination configuration, each of areas 720A, 720B, 720C, and 720D directs a scan beam to the respective scan line only when a suitable portion of scanning element 710 is in the area. As illustrated, areas 720A and 720C are 180° apart on a four-facet scanning element and simultaneously direct scan beams to respective scan lines 770A and 770C. Similarly, areas 720B and 720D are 180° apart and simultaneously direct scan beams to respective scan lines 770B and 770D. Scanner 700 in the first illumination configuration automatically switches from starting scan lines 770A and 770C to starting scan lines 770B and 770D after about a one-half facet revolution of scanning element 710.

In the second illumination configuration, areas 720A, 720B, 720C, and 720D are paired so that each input beam corresponds to a pair of areas, and the lighting system switches each input beam back and forth from a path to one incident area to path to the other incident area in the pair. For example, area 720A or 720D can be paired with area 720B or 720C. In the exemplary embodiment, areas 720A and 720B are paired, and areas 720C and 720D are paired so that aligned scan lines share the same light source and possible misalignments of that light source. In operation, when input beams are simultaneously directed to areas 720A and 720C, scanning element 710 directs scan beams to respective sets of flat mirrors 752A and 754A and 752C and 754C which reflect scan beams to respective focusing systems 756A and 756C. Scanning element 710 rotates through about half the angular span of a facet (e.g., somewhat less than 45° for a four-facet scanning element) while the scan beams scan along scan lines 770A and 770C. The illumination system then switches the input beams to paths to areas 720B and 720D. Areas 720B and 720D are positioned so that portions of facets in areas 720B and 720D are the same as the portions that were in areas 720A and 720C before the rotation by one half of a facet. While the input beams are directed to areas 720B and 720D, scanning element 710 rotates through about half a facet, and scan beams sweep along scan lines 770B and 770D. Thus from the start of scan line 770A or 770C to the end of scan line 770B or 770D, scanning element 710 rotates by one facet and positions the next facets in areas 720A and 720C for the start of another scan line. The second illumination configuration utilizes illumination power more efficiently than the first illumination configuration but requires path selection optics and control circuits that are synchronized with the rotation of scanning element 710.

In the third illumination configuration, path selection optics direct an input beam along a path to area 720A for scanning of scan line 770A. (This requires a one half facet rotation of scanning element 710.) The path selection optics can then switch the input beam to a path to area 720B or 720D. Both areas 720B and 720D then contain the proper portions of scanning element 710 to begin scanning respective scan line 770B or 770D. Once the second scan line 770B or 770D is complete, the path selection optics direct the input beam to area 720C for scanning of the third scan line 770C. Following scanning of scan line 720C, the path selection optics direct an input beam to area 720D or 720B for scanning of the last of the four scan lines 770D or 770B. The third illumination configuration has the advantage of high duty cycle without beam splitting since a single input beam (and a single light source) are used for all of scan lines 770A, 770B, 770C, and 770D, but the third illumination configuration is slower than the first or second illumination configurations because scan lines are scanned serially (one at a time). However, this illumination is attractive for applications that require high energy density since all energy from the source is directed to a single scan line.

Figure 8:
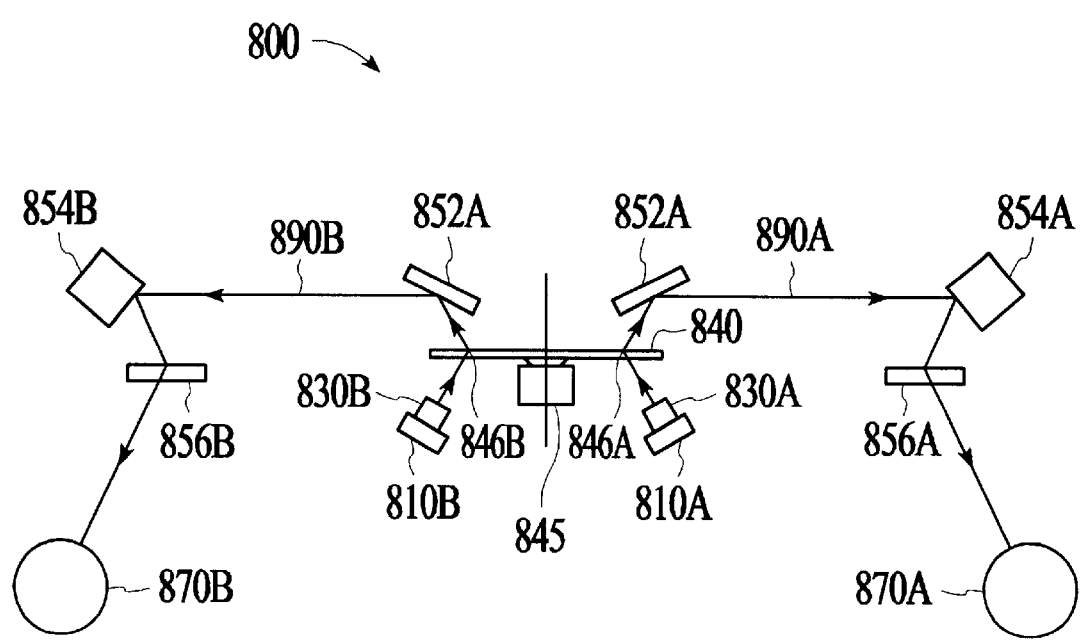
FIG. 8 illustrates a scanner in accordance with an embodiment of the invention that causes a single scan element with multiple light sources to generate multiple synchronized scan lines.

FIG. 8 shows a scanner 800 in accordance with an embodiment of the invention that uses multiple light sources 810A and 810B rather than path selection optics and path switching as in scanners 100 and 300 of FIGS. 1A, 1B, and 1C or a beam splitter as in scanner 400 of FIGS. 4A and 4B. Light sources 810A and 810B may be, for example, lasers, laser diodes, or other sources of electromagnetic radiation of suitable wavelength, intensity, and collimation. Light sources 81 OA and 810B simultaneously direct separate input beams through respective pre-scan optics 830A and 830B to respective areas 846A and 846B. A scanning element 840, which is a holographic disc in this embodiment, and areas 846A and 846B are positioned so that the same portions of two different facets of scanning element 840 are simultaneously in areas 846A and 846B. This causes symmetric deflections of scan beams 890A and 890B. The portions of scanning element 840 in areas 846A and 846B direct scan beams 890A and 890B into post-scan optics which include flat mirrors 852A and 852B, focusing elements such as curved mirrors 854A and 854B, and holographic elements 856A and 856B.

In FIG. 8, the post-scan optics direct synchronized scan beams 890A and 890B to separate image planes so that scan beams 890A and 890B scan along the surfaces of drums 870A and 870B respectively. Systems having multiple image planes and drums are commonly employed, for example, in color laser printers. For color printing, beams corresponding to different colors must be synchronized for drums 870A and 870B to apply corresponding lines and pixels of different colors to the same locations on media being printed. Alternatively, both scan beams can be directed to the same image plane and conjoined to form a single extended scan line. Scanner 800 has the advantages of using a single scanning element 840. In particular, variations in rotational speed of scanning element 840 have the same effects on scan lines on drums 870A and 870B. Use of separate light sources 810A and 810B may provide a more economical method of achieving a desired scan beam intensity than would using a single light source and beam splitting. According, separate light source can be employed in any of the above described embodiments employing multiple input beams.

Although the invention has been described with reference to particular embodiments, the description is only an example of the invention's application and should not be taken as a limitation. In particular, even though much of preceding discussion was aimed at holographic scanning elements having four facets, alternative embodiments of the invention include scanning elements including holographic discs and polygon mirrors having any number of facets. Additionally, due to the position and time synchronization provided by a single deflecting element, each of the embodiments described can be used in conjunction with the line correction techniques described to concatenate two or more scan lines to create longer extended scan lines. Various other adaptations and combinations of features embodiments disclosed are within the scope of the invention as defined by lowing claims.

I claim:

1. A scanner comprising:
    a scanning element having an axis of rotation;
    an illumination system comprising:
        a light source that generates a source beam, and
        path selection optics having a first operating mode and a second operating mode, wherein in the first operating mode, the path'selection optics direct the source beam along a first path to a first area, and the source beam forms a first input beam, and in the second operating mode, the path selection optics direct the source beam along a second path to a second area, and the source beam forms a second input beam,
    wherein the first and second areas are separated from each other by an angle about the axis of rotation of the scanning element and situated so that portions of the scanning element move through the first and second areas during a scanning operation, wherein a first scan beam originates from deflection of the first input beam by portions of the scanning element in the first area, and a second scan beam originates from deflection of the second input beam by portions of the scanning element in the second area; and
    post-scan optics that direct the first scan beam to illuminate a first scan line and direct the second scan beam to illuminate a second scan line.

2. The scanner of claim 1, wherein the scanning element is a holographic disc.

3. The scanner of claim 1, wherein the scanning element is a polygon mirror.

4. The scanner of claim 1, wherein the illumination system alternates between directing the first input beam to the first area and directing the second input beam to the second area.

5. The scanner of claim 4, wherein:
the scanning element has a plurality of substantially identical facets; and
the first and second areas are situated so that a first portion of the scanning element in the first area when the scanning element has a first orientation is substantially identical to a second portion of the scanning element that is in the second area after rotating the scanning element from the first orientation by about one half an angular span of a facet.

6. The scanner of claim 5, wherein the scanning element is a holographic disc.

7. The scanner of claim 5, wherein the scanning element is a polygon mirror.

8. The scanner of claim 1, wherein the illumination system simultaneously directs the first input beam and the second input beam to the first and second areas, respectively.

9. The scanner of claim 1, wherein the first and second areas are situated relative to the scanning element so that when the post-scan optics direct the first scan beam to an end of the first scan line, the post-scan optics also direct the second scan beam to a start of the second scan line.

10. The scanner of claim 1, wherein the angle separating the first and second areas spans at least one facet of the scanning element.

11. The scanner of claim 1, wherein the angle separating the first and second areas spans an integer multiple of an angular size of a facet of the scanning element.

12. A scanner comprising:
a scanning element having an axis of rotation;
an illumination system comprising:
  a light source that generates a source beam, and
  path selection optics having a first operating mode and a second operating mode, wherein in the first operating mode, the path selection optics direct the source beam along a first path to a first area, and the source beam forms a first input beam, and in the second operating mode, the path selection optics direct the source beam along a second path to a second area, and the source beam forms a second input beam,
wherein the first and second areas are separated from each other by an angle about the axis of rotation of the scanning element and situated so that portions of the scanning element move through the first and second areas during a scanning operation, wherein a first scan beam originates from deflection of the first input beam by portions of the scanning element in the first area, and a second scan beam originates from deflection of the second input beam by portions of the scanning element in the second area;
post-can optics that direct the first scan beam to illuminate a first scan line and direct the second scan beam to illuminate a second scan line, wherein the post-scan optics form the first scan line and the second scan line, wherein the post-scan optics form the first scan line and the second scan line in an image plane; and
an alignment system that aligns the first scan line with the second scan line to form an extended scan line that extends along the length of the first and second scan lines.

13. The scanner of claim 12, wherein the post-scan optics comprise a mirror which is in an optical path from the scanning element to the image plane, the mirror comprising:
a first mirrored section positioned to reflect the first scan beam;
a second mirrored section positioned to reflect the second scan beam; and
a transparent section between the first and second mirrored sections.

14. The scanner of claim 13, wherein the alignment system further comprises a beam detector assembly mounted in the transparent section of the mirror.

15. The scanner of claim 12, wherein the alignment system comprises a beam detector assembly situated between the image plane and the scanning element and in a gap between a path of the first scan beam leading to an end of the first scan line and a path of the second scan beam leading to a start of the second scan line.

16. A method for illuminating scan lines, comprising:
generating a source beam by a light source;
directing a first input beam along a first path to a first area, the source beam forming the first input beam;
directing a second input beam along a second path to a second area separated from the first area by an angle about a rotation axis of a scanning element, the source beam forming the second input beam;
positioning the scanning element so that portions of the scanning element move through the first area and the second area during scanning, wherein portions of the scanning element in the first area deflect the first input beam to create a first scan beam, and portions of the scanning element in the second area deflect the second input beam to create a second scan beam; and
directing the first and second scan beams to post-scan optics that direct the first scan beam and the second scan beam to respectively form a first scan line and a second scan line.

17. The method of claim 16, further comprising:
generating the source beam; and
alternating between directing the source beam along a first path to perform the step of directing the first input beam to the first area and directing the source beam along a second path to perform the step of directing the second input beam to the second area.

18. The method of claim 16, wherein the steps of directing the first input beam to the first area and directing the second input beam to the second area are performed simultaneously.

19. The method of claim 16, wherein the scanning element is a holographic disc.

20. The method of claim 16, wherein the scanning element is a polygon mirror.

21. The scanner of claim 16, wherein the angle separating the first and second areas spans at least one facet of the scanning element.

22. The scanner of claim 16, wherein the angle separating the first and second areas spans an integer multiple of an angular size of a facet of the scanning element.

23. A method for illuminating scan lines, comprising:
generating a source beam by a light source;
directing a first input beam to a first area, the source beam forming the first input beam;
directing a second input beam to a second area separated from the first areas the source beam forming the second input beam;
positioning a scanning element so that portions of the scanning element move through the first area and the second area during scanning, wherein portions of the scanning element in the first area deflect the first input beam to create a first scan beam, and portions of the scanning element in the second area deflect the second input beam to create a second scan beam;

directing the first and second scan beams to post-scan optics that direct the first scan beam and the second scan beam to respectively form a first scan line and a second scan line; and aligning the first and the second scan lines to form a third scan line that extends along lengths of the first and second scan lines.

24. The method of claim 23, further comprising detecting respective positions of an end of the first scan line and a start of the second scan line using a detector assembly that is situated between the scanning element and a plane containing the first and second scan lines, the detector assembly being in a gap between a path of the first scan beam to the end of the first scan line and a path of the second scan beam to the start of the second scan line.

25. A method for scanning comprising:

generating a source beam by a light source;

generating an input beam, the source beam forming the input beam;

directing the input beam along a path to a first area of a scanning element while forming a first scan line; and changing the path of the input beam to direct the input beam to a second area of the scanning element while forming a second scan line, the second area being separated from the first area by an angle about a rotation axis of the scanning element.

26. The method of claim 25, wherein changing the path is performed during dead time when the first area of the scanning element would not direct the input beam into a desired scanning aperture.

27. The scanner of claim 25, wherein the angle separating the first and second areas spans at least one facet of the scanning element.

28. The scanner of claim 25, wherein the angle separating the first and second areas spans an integer multiple of an angular size of a facet of the scanning element.

29. A scanner comprising:

a scanning element;

an illumination system that directs a first input beam to a first area and a second input beam to a second area, the first and second areas being separated from each other and situated so that portions of the scanning element move through the first and second areas during a scanning operation, wherein a first scan beam originates from deflection of the first input beam by portions of the scanning element in the first area, and a second scan beam originates from deflection of the second input beam by portions of the scanning element in the second area;

post-scan optics that direct the first scan beam to illuminate a first scan line and direct the second scan beam to illuminate a second scan line, wherein the post-scan optics form the first scan line and the second scan line in an image plane, wherein the post-scan optics comprise a mirror which is in an optical path from the scanning element to the image plane, the mirror comprising:

a first mirrored section positioned to reflect the first scan beam, a second mirrored section positioned to reflect the second scan beam, and a transparent section between the first and second mirrored section; and an alignment system that aligns the first scan line with the second scan line to form an extended scan line that extends along the length of the first and second scan lines, wherein the alignment system further comprises a beam detector assembly mounted in the transparent section of the mirror.

30. A scanning element;

an illumination system that directs a first input beam to a first area and a second input beam to a second area, the first and second areas being separated from each other and situated so that portions of the scanning element move through the first and second areas during a scanning operation, wherein a first scan beam originates from deflection of the first input beam by portions of the scanning element in the first area, and a second scan beam originates from deflection of the second input beam by portions of the scanning element in the second area;

post-scan optics that direct the first scan beam to illuminate a first scan line and direct the second scan beam to illuminate a second scan line, wherein the post-scan optics form the first scan line and the second scan line in an image plane; and an alignment system that aligns the first scan line with the second scan line to form an extended scan line that extends along the length of the first and second scan lines, wherein the alignment system comprises a beam detector assembly situated between the image plane and the scanning element and in a gap between a path of the first scan beam leading to an end of the first scan line and a path of the second scan beam leading to a start of the second scan line.

31. A method for illuminating scan lines, comprising:

directing a first input beam to a first area;

directing a second input beam to a second area separated from the first area;

positioning a scanning element so that portions of the scanning element move through the first area and the second area during scanning, wherein portions of the scanning element in the first area deflect the first input beam to create a first scan beam, and portions of the scanning element in the second area deflect the second input beam to create a second scan beam;

directing the first and second scan beams to post-scan optics that direct the first scan beam and the second scan beam to respectively form a first scan line and a second scan line;

aligning the first and the second scan lines to form a third scan line that extends along lengths of the first and second scan lines; and detecting respective positions of an end of the first scan line and a start of the second scan line using a detector assembly that is situated between the scanning element and a plane containing the first and second scan lines, the detector assembly being in a gap between a path of the first scan beam to the end of the first scan line and a pat of the second scan beam to the start of the second scan line.

* * * * *